United States Patent
Buchter

(10) Patent No.: US 8,731,009 B2
(45) Date of Patent: May 20, 2014

(54) BROADBAND HIGH POWER LIGHT SOURCE

(75) Inventor: Scott Charles Buchter, Espoo (FI)

(73) Assignee: NKT Photonics A/S, Birkerod (DK)

( * ) Notice: Subject to any disclaimer, the term of this patent is extended or adjusted under 35 U.S.C. 154(b) by 255 days.

(21) Appl. No.: 13/263,967

(22) PCT Filed: Apr. 8, 2010

(86) PCT No.: PCT/DK2010/050080
§ 371 (c)(1),
(2), (4) Date: Jan. 11, 2012

(87) PCT Pub. No.: WO2010/115432
PCT Pub. Date: Oct. 14, 2010

(65) Prior Publication Data
US 2012/0099340 A1   Apr. 26, 2012

Related U.S. Application Data

(60) Provisional application No. 61/167,610, filed on Apr. 8, 2009.

(51) Int. Cl.
*H01S 3/30* (2006.01)

(52) U.S. Cl.
USPC .................................. 372/6; 372/21; 372/22

(58) Field of Classification Search
CPC . H01S 3/067; H01S 3/06733; H01S 3/06708; H01S 3/094046; H01S 3/1086; H01S 3/108; H01S 3/302; H01S 3/30
USPC .................................................. 372/6, 21, 22
See application file for complete search history.

(56) References Cited

U.S. PATENT DOCUMENTS

| | | | |
|---|---|---|---|
| 7,171,089 B2 * | 1/2007 | Feder et al. ................... | 385/122 |
| 2004/0057682 A1 * | 3/2004 | Nicholson et al. ............ | 385/122 |
| 2006/0198588 A1 * | 9/2006 | Kuksenkov et al. .......... | 385/122 |
| 2009/0034562 A1 * | 2/2009 | Nicholson et al. ............ | 372/6 |
| 2009/0074023 A1 * | 3/2009 | Wadsworth .................... | 372/50.1 |
| 2009/0129409 A1 * | 5/2009 | Hirano et al. ................. | 372/6 |
| 2010/0172018 A1 | 7/2010 | Mattsson et al. | |

FOREIGN PATENT DOCUMENTS

WO   WO 2005/062113 A1   7/2005
WO   WO 2008/067823 A1   6/2008

OTHER PUBLICATIONS

International Search Report (PCT/ISA/210) issued on Apr. 26, 2010, by Nordic Patent Office as the International Searching Authority for International Application No. PCT/DK2020/050080.

(Continued)

*Primary Examiner* — Kinam Park
(74) *Attorney, Agent, or Firm* — Buchanan Ingersoll & Rooney PC

(57) ABSTRACT

The present invention relates to a super continuum light source comprising a pump source arranged to emit light having a center wavelength $\lambda_{center}$ arranged to provide pump pulse to a generator fiber, where the refractive index profile of the core is arranged to allow modal cleaning of the light is it propagates, such as via stimulated Raman scattering. An example of invention is the application of a relatively high power pump laser utilized to provide an optical super continuum with relatively high spectral density and/or good beam quality even though the pump laser may provide a beam with a high $M^2$.

21 Claims, 5 Drawing Sheets

(56) References Cited

OTHER PUBLICATIONS

Written Opinion (PCT/ISA/237) issued on Apr. 26, 2010, by Nordic Patent Office as the International Searching Authority for International Application No. PCT/DK2020/050080.

Ji et al., "Near-Diffraction-Limited Supercontinuum Generation in a Cladding-Pumped Nonlinear Fiber Converter" Lasers and Electro-Optics (CLEO) and Quantum Electronics and Laser Science Conference (QELS), 2010 Conference on May 16-21, 2010, 2 pages.

Savitski et al., "Infrared Supercontinuum form a Large Mode area PCF under Extreme Picosecond Excitation" Optical and Quantum Electronics, Apr. 8, 2008, vol. 39, Issue 15, pp. 1297-1309.

A. Kudlinski et al., "Dispersion decreasing photonic crystal fiber for UV-enhanced supercontinuum generation", 2006 Digest of the LEOS Summer Topical Meetings, pp. 54-55.

A. Kudlinski et al., "Visible cw-pumped supercontinuum", Optics Letters, Oct. 15, 2008, pp. 2407-2409, vol. 33, No. 20.

J.C. Travers et al., "Multi-Watt Supercontinuum Generation from 0.3 to 2.4 µm in PCF Tapers," Conference on Lasers and Electro-Optics/Quantum Electronics and Laser Science Conference and Photonic Applications Systems Technologies, OSA Technical Digest Series (CD) (Optical Society of America, 2007), 2 pages.

"White light supercontinuum: Power struggle", EuroPhotonics, Feb./Mar. 2010, p. E4.

N.B. Terry et al., "An explanation of SRS beam cleanup in graded-index fibers and the absence of SRS beam cleanup in step-index fibers", Optics Express, Dec. 24, 2007, pp. 17509-17519, vol. 15, No. 26.

M.L. Nischan et al., "Active Spectral Imaging", Lincoln Laboratory Journal, 2003, pp. 131-144, vol. 14, No. 1.

* cited by examiner

BROADBAND HIGH POWER LIGHT SOURCE

FIELD OF INVENTION

The present invention relates to a super continuum light source comprising a pump source arranged to emit light having a centre wavelength $\lambda_{centre}$ and a spectral width $\Delta\lambda$, the light source further comprising a generator fibre, said generator fibre having an input end and an output end, the latter being arranged to emit an optical super continuum when the light source is in use.

BACKGROUND ART

Super continuum (SC) generation is a nonlinear phenomenon characterised by dramatic spectral broadening of intense light passing through a nonlinear material. SC generation occurs in various media and may find use in numerous applications such as spectroscopy or ultra-short-pulse generation. Spectral slicing of a generated SC is an elegant way of replacing multiple light sources having separate wavelengths.

Many prior art SC light sources are based on micro structured fibres (MF) which posses unique optical properties with a large degree of freedom of design thus allowing for optimization of the fibre for SC generation. However, SC generation in standard fibre has also been demonstrated. Most prior art disclosures of SC sources utilise femto-second (fs) pulses ($10^{-15}$ s) to generate the SC. The physical mechanism responsible for the SC generation is believed to be due to multiple nonlinear processes. It has also been shown that it is possible to create SC by use of pico- and nanosecond pulses, and the mechanism responsible for these SCs is often attributed to a combination of four wave mixing and stimulated Raman scattering. In either case of pump duration and/or fibre type, the size of the guiding core has been relatively small (<6 μm diameter) to ensure a high optical density in the core so that non-linear effects are maximized. This limits the optical power with which the fibre may be pumped either due to the damage threshold of the end facet of the fibre or the damage threshold of the fibre core. The optical power may also be limited by the availability or cost of a high power laser having an output with a sufficient beam quality to allow a substantial amount of its output to enter the fibre.

DISCLOSURE OF INVENTION

Many applications of SC light sources may benefit from high optical power particularly when a relatively high beam quality of the SC may be obtained. In this way each slice of the spectrum may in one embodiment perform substantially as a laser with relatively high power. Accordingly, in one embodiment the present invention relates to a SC light source capable of providing an output with relatively high optical power.

In one embodiment the invention relates to a SC light source comprising a pump source arranged to emit pump light in a pump beam, said pump light having a centre wavelength $\lambda_{centre}$, the light source further comprising a generator fibre having an input end and an output end, said generator fibre being arranged to support a fundamental mode, a zero dispersion wavelength $\lambda_{ZDW}$ for said fundamental mode and a transverse refractive index profile with a core region having a characteristic diameter D≥10 μm, said pump source being arranged to inject pump light into the input end of said generator fibre with an optical peak power P≥100 W and a spectral width $\Delta\lambda$ spectrum, wherein said refractive index profile is arranged to allow SRS modal cleaning and $\lambda_{ZDW}-(\lambda_{centre}+\Delta\lambda/2)\geq 0$ such as ≥0.5 THz·$\lambda^2_{centre}$/c, such as ≥2 THz·$\lambda^2_{centre}$/c, such as ≥5 THz·$\lambda^2_{centre}$/c, such as ≥10 THz·$\lambda^2_{centre}$/c, such as ≥13 THz·$\lambda^2_{centre}$/c, such as ≥26 THz·$\lambda^2_{centre}$/c, such as ≥39 THz·$\lambda^2_{centre}$/c, such as ≥52 THz·$\lambda^2_{centre}$/c, such as ≥65 THz·$\lambda^2_{centre}$/c, such as ≥78 THz·$\lambda^2_{centre}$/c, such as ≥−91 THz·$\lambda^2_{centre}$/c where c is the speed of light in the core. In one embodiment said generator fibre supports one or more modes at said centre wavelength. In one embodiment the invention relates to a system comprising such a light source.

The large core of the generator fibre may accept pump light with a high optical peak power and/or high average power without reaching break down limits of the end facet and/or bulk material of the core. In one embodiment a relatively high numerical aperture (NA) combined with the relatively large core allows the core to accept pump beams with relatively high $M^2$. The inventors have found that by utilizing so called SRS modal cleaning (discussed below) red shifted pump light (e.g. via a Raman shift) will have increased power in the fundamental mode of the fibre relative to pump light in higher order modes after this red shifting. At the same time the inventors have realized that pump light at longer wavelengths than the zero dispersion wavelength may initiate the generation of an often wide smooth super continuum. The inventors have surprisingly found that when this smooth SC is generated due to pump light having a low number of modes or being substantially single mode the generated super continuum will maintain this beam quality. However, if the generator fibre is pumped with multimode light directly at a wavelength longer than $\lambda_{ZDW}$, the generated SC will likely inherit the multimode nature of the pump light. Note that throughout this specification at least in one embodiment wavelength refers to the centre wavelength of the pump light. The fibre is in one embodiment at least partly pumped below $\lambda_{ZDW}$ to allow SRS model cleaning to take effect before the pump light red-shifts past $\lambda_{ZDW}$. The term "partly" here referring to that some of the pump light may in one embodiment be above a ZDW of the fibre. Once red-shifted past the $\lambda_{ZDW}$ the red-shifted pump light will in one embodiment have lower $M^2$ values which are substantially transferred and maintained by the SC generated from this light. This smooth SC will often also contribute at wavelengths lower than $\lambda_{ZDW}$ likely due to phase-matching conditions being fulfilled between lower and higher wavelengths. In one embodiment the invention relates to a method of providing a high power super continuum with high beam quality comprising a. Providing a generator fibre having an input end and an output end and a zero dispersion wavelength $\lambda_{ZDW}$ for a fundamental mode and a transverse refractive index profile with a core region having a characteristic diameter D≥10 μm b. Providing a pump light source arranged to emit pump light in a pump beam, said pump light having a centre wavelength $\lambda_{centre}$ and an optical peak power P≥100 W and a spectral width $\Delta\lambda$ spectrum c. Arranging said pump source to inject pump light into the input end of said generator fibre said generator fibre being arranged to support a fundamental mode at least at said centre wavelength wherein said refractive index profile is arranged to allow SRS modal cleaning and $\lambda_{ZDW}-(\lambda_{centre}+\Delta\lambda/2)\geq 0$ such as ≥0.5 THz·$\lambda^2_{centre}$/c, such as ≥2 THz·$\lambda^2_{centre}$/c, such as ≥5 THz·$\lambda^2_{centre}$/c, such as 100 THz·$\lambda^2_{centre}$/c, such as ≥13 THz·$\lambda^2_{centre}$/c, such as ≥26 THz·$\lambda^2_{centre}$/c, such as ≥39 THz·$\lambda^2_{centre}$/c, such as ≥52 THz·$\lambda^2_{centre}$/c, such as ≥65 THz·$\lambda^2_{centre}$/c, such as ≥78 THz·$\lambda^2_{centre}$/c, such as ≥91 THz·$\lambda^2_{centre}$/c where c is the speed of light. In one embodiment the fibre further supports one or more higher order modes at least at said centre wavelength.

The red shifting along with other non linear process occur as the light propagates through the generator fibre. The modal quality of the light in the fibre may therefore change with position. In the present context the $M^2$ inside the fibre is in one embodiment taken to mean the $M^2$ value of the beam due to the light had it been allowed to escape from the fibre through an end facet located at that position along the fibre.

In the present context a super continuum spectrum is in one embodiment taken to mean a spectrum spanning more than one octave, such as more than 1.5 octave, such as more than 2 octaves, such as more than 3 octaves, such as more than 4 octaves, such as more than 5 octaves. In one embodiment a super continuum is taken to mean a spectrum of light having spectral width of more than 500 nm, such as more than 700 nm, such as more than 800 nm, such as more than 900 nm, such as more than 1000 nm, such as more than 1100 nm, such as more than 1200 nm, such as more than 1300 nm, such as more than 1400 nm, such as more than 1500 nm, such as more than 1600 nm, such as more than 1700 nm, such as more than 1800 nm, such as more than 1900 nm, such as more than 2000 nm. In one embodiment a reference to a super continuum light source is taken to mean source that the pump source and said generator fibre are arranged so that during use said generator fibre emits output having such a spectrum. A super continuum may have valleys, peaks and holes in the spectrum. In this context spanning is taken to mean that the spectral power is more than −20 dB/nm relative to the mean optical power of the output light, such as more than −10 dB/nm, such as more than −5 dB/nm, such as more than −3 dB/nm, such as more −2 dB/nm in more than 50% of the span, such as in more than 75% of the span, such as in more than 85% of the span, such as in more than 95% of the span. In one embodiment spanning is taken to mean that the spectral power is more than −20 dBm/nm, such as more than −10 dBm/nm, such as more than −5 dBm/nm, such as 0 dBm/nm, such as more than 5 dBm/nm, such as more than 10 dBm/nm, such as more than 20 dBm/nm, such as more than 30 dBm/nm, such as more than 40 dBm/nm in more than 50% of the span, such as in more than 75% of the span, such as in more than 85% of the span, such as in more than 95% of the span.

It is noted that in the present context a pump source may in one embodiment comprise a laser followed by one or more amplifiers arranged to raise the power level. In one embodiment the pump source comprises one or more optical components arranged to shape the spectrum of the pump light. In one embodiment such amplifier(s) and/or optical components are understood to be a part of the pump source although no specifically mentioned.

The light emitted at the output end of the fibre when the light source is in use, otherwise referred to as output light, will commonly comprise one or more of: attenuated components from the pump source otherwise transmitted through the fibre substantially unchanged, Raman-shifted (or otherwise redshifted) pump light at shorter wavelengths than $\lambda_{ZDW}$, and a SC generated by red-shifted pump light having wavelengths longer than $\lambda_{ZDW}$. In one embodiment the red shifted pump light may in itself be said to form (often a peaked) SC. In the context of the present text we refer to the SC generated from red shifted pump light at wavelengths longer than $\lambda_{ZDW}$ as the smooth SC (although this may not necessarily be smooth) and light generated from one or more red shifts of light having a wavelength below $\lambda_{ZDW}$ as red shifted pump light. The sum of these components at the output end of the fibre is referred to as the generated SC. The output light may further comprise attenuated pump light otherwise transmitted through the generator fibre unchanged.

In one embodiment the inventors have surprisingly found that the smooth SC in combination with the red shifted pump light forms output light with low values of $M^2$. Accordingly, a super continuum light source according to the invention may in one embodiment provide output light with a widely spanning SC having a considerable spectral density as the fibre allows pump light with considerable peak power. At the same time the light source may in one embodiment provide a beam with high quality (i.e. low $M^2$). This may in several applications dramatically increase the utility of the high power SC output.

In the context of the present text spectral width of the output light is in one embodiment taken to mean the widest measure of the spectrum wherein the end points are at least at −50 dB power per nm relative to the power per nm at the center wavelength of the pump source, such as at least at −20 dB per nm, such as at least at −10 dB per nm, such as at least at −5 dB per nm, such as at least at −3 dB per nm. In the event that the pump source provides two or more separate center wavelengths this relative power measurement is in one embodiment to be measured relative to the center wavelength having the lowest power in the output light. In one embodiment the relative power measurement is measured relative to the center wavelength having the highest power in the output light. In one embodiment the relative power measurement is in one embodiment to be measured relative to the mean of the power of the output light at each center wavelength. In one embodiment the injected pump light is in itself a super continuum. In one such an embodiment the relative power measurement is to be measured relative to the maximum power per nm of the output light. In one such an embodiment the relative power measurement is to be measured relative to the mean power per nm of the output light where the mean is calculated over all wavelength having more than −30 dB/nm relative to maximum power per nm of the spectrum, such as more than −20 dB/nm, such as more than −10 dB/nm.

In one embodiment the invention relates to a tuneable light source comprising a light source according to the invention and a non-linear crystal arranged so that at least a part of output light emitted from the output end of the generator fibre is brought into interaction with said non-linear crystal under an angle cp relative to the surface of said non-linear crystal. In this way a tunable light source which is able to provide shorter wavelengths than provided by the super continuum light source may be provided. Compared with prior art super continuum sources, the super continuum may now have sufficient optical power to allow a spectral slice to be frequency doubled, tripled or otherwise frequency increased by a non linear crystal and obtain relatively high output power. In one embodiment the non-linear crystal is selected from the group of BBO (β-barium borate), KDP (potassium dihydrogen phosphate), KTP (potassium titanyl phosphate), and lithium niobate. In one embodiment a tunable light source is obtain via a different non-linear material and/or medium.

In one embodiment the invention relates to hyperspectral imaging system comprising a light source according the invention. Due to the relatively high spectral density (i.e. optical power per nm wavelength) over a wide range of wavelength, available in one embodiment, the performance of system may be improved as imaging can for example be done remotely, i.e. at a larger distance than lower power hyperspectral imaging systems. This can for example be an advantage for air-borne imaging systems.

In one embodiment the invention relates to a white light LIDAR (DOAS) system comprising a light source according to the invention. Due to the high spectral density available in one embodiment over a wide range of wavelength the performance of the system may be improved as the range of a LIDAR/DOAS system and/or the resolution of a LIDAR/DOAS system may be enhanced.

In one embodiment the invention relates to an optical amplifier comprising an active amplifier fibre and a supercontinuum light source according to the invention arranged to pump said active fibre.

In one embodiment the invention relates to a system for illumination comprising a light source according to the invention. Due to the relatively high spectral density available in one embodiment over a wide range of wavelength the performance of system may be improved as the range and/or the resolution and/or the spectral bandwidth and/or spectral position of an illumination system can be improved.

DETAILS OF THE INVENTION

The characteristic diameter of the core is term applied in the context of the present specification as generalization that enables determination of the diameter of the core even if the core of the fibre is not circular. As is well-known in the art an optical fibre guides light along its length primarily in the core of the fibre. The core is normally located along the centre axis of the fibre and is surrounded by one or more cladding regions. Other shapes of cores are also possible such polarization maintaining fibres with an elliptical core. In one embodiment the fibre comprises two or more cores. In one embodiment these cores are coaxial cores and such cores may in one embodiment provide functions well-known in the art such as dispersion control. In one embodiment the core is not coaxial such as in a dual-core optical fibre. The cladding region(s) is/are often further surrounded by one or more coatings and/or other layers often suitable for providing environmental and/or mechanical shielding. Light is normally guided in the core by refraction and/or total internal reflection due to a higher refractive index in the core relative to the cladding. In one embodiment light is guided by so-called photonic bandgap (PBG) effect. The average refractive index of the core and/or cladding(s) may be engineered by doping the base material and/or by introducing microstructures running along the length of the fibre. Such microstructures are typically air/vacuum filled but may also comprise liquids, gasses and solids such as doped or pure silica. Fibres comprising microstructures (such as photonic crystal fibres, photonic bandgap fibres, leaky channel fibres, holey fibres etc.) are in this context referred to as microstructured fibres. Unless otherwise noted the refractive index refers to the average refractive index which in one embodiment may be calculated for the core and each layer surrounding separately it whether the fibre is standard fibre, where the core and any cladding layers surrounding that core have a substantially homogeneous refractive index, or a microstructured fibre where the core and/or one or more cladding layers comprise microstructures. In one embodiment the refractive index varies within one or more of the core and/or cladding regions such as due to a variation in dopant concentration and/or the fraction of microstructures. In one such embodiment the refractive index refers to a local average such as a running average In one embodiment the average as taken over a characteristic length corresponding to wavelength, i.e. such as 2 times the wavelength, the wavelength or half of the wavelength.

In microstructured fibres the microstructures in the cladding may for certain designs be utilized to guide light using the so called photonic bandgab effect which is well-known in the art.

The core and/or cladding of the fibre is in one embodiment composed by silica as a base material, such as fused silica, with or without dopants and/or microstructures formed by air/vacuum filled holes. The present invention is not necessarily limited to silica based materials; however, for simplicity the remaining presentation of the invention will assume a silica base fibre (standard or micro structured). Changes to parameters or the like due to different base materials will be apparent to a skilled person such as the magnitude of a Raman frequency shift or break down limits of the material.

In a given cross section perpendicular to the longitudinal axis of a fibre, said fibre may be said to have a transverse refractive index profile. In one embodiment the cross section of the generator fibre is substantially constant along the length of the fibre, but in one embodiment the transverse cross section changes between the input end and the output end. As an example such change may be due to tapering either reducing or increasing the diameter of the fibre. Such tapering may also form one or more waists. In one embodiment a reduction of the diameter of the fibre alters the local non linear properties of the generator fibre and thus influences the output light of the source. In one embodiment a variation in the refractive index profile may be applied to shape the dispersion profile of the fibre. In one embodiment the location along the fibre of a variation may be chosen according to the spectrum of the light within the fibre at this location. In one embodiment a variation in the refractive index profile is due to a tapering performed during drawing of the fibre. In one embodiment a variation in the refractive index profile is due to a tapering performed post to drawing of the fibre. In one embodiment variation in the refractive index profile contributes to extending the spectrum of the output light to shorter wavelengths, such as a wavelength below 470 nm, such as below 450 nm, such as below 420 nm, such as below 400 nm, such as below 390 nm, such as below 380 nm, such as below 370 nm, such as below 360 nm, such as below 350 nm. In one embodiment extending the output light to shorter wavelengths by tapering is performed according to the teachings in the paper "Dispersion decreasing photonic crystal fiber for UV-enhanced supercontinuum generation", by A. Kudlinski, A. K. George and J. C. Knight, 2006 Digest of the LEOS Summer Topical Meetings. In one embodiment extending the output light to shorter wavelengths by tapering is performed according to the teachings in papers, such as Alexandre Kudlinski and Arnaud Mussot, "Visible cw-pumped supercontinuum," Opt. Lett. 33, 2407-2409 (2008), and/or J. C. Travers, A. B. Rulkov, S. V. Popov, J. R. Taylor, A. Kudlinski, A. K. George, and J. C. Knight, "Multi-Watt Supercontinuum Generation from 0.3 to 2.4 μm in PCF Tapers," in Conference on Lasers and Electro-Optics/Quantum Electronics and Laser Science Conference and Photonic Applications Systems Technologies, OSA Technical Digest Series (CD) (Optical Society of America, 2007), paper JTuB2, and/or White light supercontinuum: Power struggle (Photonics Spectra, pp. E4-E5, February 2010).

In one embodiment the transverse refractive index profile comprises at least one core region arranged to guide the light. Assuming, for one embodiment, a cylinder symmetrical core region the refractive index variation of the core region may be described as $$n(r) = \Delta n(r) + n_c,$$

where n is the refractive index, r is the radial distance from the centre of the cross section, Δn is the variation of the refractive index relative to the cladding refractive index $n_c$. In one embodiment the cladding refractive index $n_c$ is the average refractive index of the cladding. In one embodiment the cladding refractive index $n_c$ is the refractive index at a radial distance, $r_c$, outside which less than 10% of the fundamental mode of the light propagates, such as less than 5% propagates outside $r_c$, such as less than 1% propagates outside $r_c$, such as less than 0.1% propagates outside $r_c$. In one embodiment the radial distance $r_c$ is found for the centre wavelength of the pump source. In one embodiment $r_c$ is found as the largest distance satisfying the above percentile constrain for the wavelengths which the light source is arranged to produce. In one embodiment $r_c$ is found as the largest distance satisfying the above percentile constrain for the wavelengths guided by the generator fibre.

In one embodiment $r=r_c$ defines the core region of the generator fibre.

The core of the generator fibre may be said to have a characteristic diameter D. In one embodiment D is defined as $2 \cdot r_c$. In one embodiment $n(r)$ is substantially at its maximum in the centre of the cross section and D is defined as equal to two times the radial distance for which $n(r)=n(0)/2$. In one embodiment $n(r)$ is not at its maximum at the centre. In one such embodiment D is defined as two times the maximum distance (less than $r_c$) for which $n(r)$ equals to $n_{max}/2$.

In an embodiment, the core may comprise co-dopants that provide a predetermined refractive index profile of the core. In an embodiment, the predetermined index profile may have a maximum in the centre of the core, such as a parabolic index profile, a W-profile, or another profile known from conventional optical fibres. In one embodiment, the predetermined index profile may have a local minimum in centre of the core—such as a local minimum that may result from fabrication of doped rods using modified chemical vapour deposition (MCVD).

The above discussion of $r_c$, $n(r)$ and D has assumed a cylinder symmetry around the centre of the cross section. In the event that the symmetry is shifted from the centre of the cross section to another centre of symmetry, r may be measured relative to this centre providing for mutatis mutandis changes to the determination of $r_c$, $n(r)$ and D. In the event that the transverse refractive index profile is not rotational symmetric, such as a generator fibre with an elliptical core region, the transverse refractive index profile may in general be described by a function $n(r,\theta)=\Delta n(r,\theta)+n_c(\theta)$ where $\theta$ is an angle ranging from 0 to $2\lambda$. In one embodiment the $n_c(\theta)$ may be assumed substantially constant. In one embodiment $r_c$ is also a function of r and $\theta$. In one embodiment the origin of the coordinate system defined by r and $\theta$ is located in the centre of the cross section. In one embodiment the origin of the coordinate system defined by r and $\theta$ is located in the centre of gravity of the transverse refractive index profile. In one embodiment the characteristic diameter $D(\theta)$ is generally a function of $\theta$ determined as described above for the cylindrically symmetric case for each value of $\theta$. In one embodiment the characteristic diameter D is said to be the minimum value of $D(\theta)$. In one embodiment the characteristic diameter D is said to be the maximum value of $D(\theta)$.

In one embodiment the characteristic diameter D is said to be the mean value of $D(\theta)$.

In one embodiment the generator fibre has a core region substantially shaped according to a power-law index profile characterized by $$n(r) = \begin{cases} n_1 \sqrt{1 - 2\Delta(r/r_{cladding})^\alpha} & r \leq r_{cladding} \\ n_{cladding} & r > r_{cladding} \end{cases}$$

where $$\Delta = \frac{n_1^2 - n_{cladding}^2}{2n_1^2},$$

$n_1$ is the nominal refractive index on the centre axis, $n_{cladding}$ is the refractive index of the cladding, which is assumed constant and $\alpha$ is a parameter that defines the shape of the profile hence this profile is sometimes called an alpha profile. However, in other embodiments the index of the cladding may be a function of r and/or $\theta$ without departing from the power-law index profile of the core. Similar to other types of fibres, a layered or otherwise structured cladding may provide for functionality of the fibre such as those known from double-clad fibres, air-clad fibres and dispersion compensation fibres.

In one embodiment $\alpha=2$ and the fibre is said to have a parabolic index profile. The refractive index profile for a graded-index fibre is commonly nearly parabolic. A parabolic profile may result in continuous refocusing of the light in the centre of the core as the light travels in the core. A parabolic profile may therefore reduce modal dispersion relative to a step index fiber. For a step index fibre it may in one embodiment be said that $\alpha \rightarrow \infty$.

Relative to the above discussion of refractive index profile it may be noted that real life fibre often has an index profile that deviates from the mathematical expression at least as a result of production inaccuracies. In one embodiment the above mathematical expressions are taken to describe the refractive index profile to accuracy within 50%, such as within 30%, such as within 15%, such as within 10%, such as within 10%, such as within 5%, such as within 3%, such as within 1%. It is further noted that the above equations assume a single homogeneous cladding surrounding the core. In one embodiment the core is surrounded by one or more cladding layers. The index profile of these cladding layers may be homogeneous or may vary with r and/or $\theta$. In one embodiment the fibre comprises a cladding having a power law profile having substantially identical values of $\alpha$. In one embodiment the fibre comprises a cladding having a power law profile as well as a core having a power law profile wherein the $\alpha$-value of the two is not identical. In one embodiment one cladding layer acts as cladding (i.e. confines the light) for some wavelengths whereas it contributes to guiding light at other wavelengths. In such designs the dispersion of the fibre may be shaped which in turn may shape the spectrum such as phase matching to shorter wavelengths. For fibres with multiple claddings and/or cores the characteristic diameter may be determined according to the general criteria previously discussed.

In one embodiment the characteristic diameter D is larger than or equal to 10 µm, such as larger than or equal to 25 µm, such as larger than or equal to 50 µm, such as larger than or equal to 75 µm, such as larger than or equal to 100 µm, such as larger than or equal to 125 µm, such as larger than or equal to 150 µm, such as larger than or equal to 175 µm, such as larger than or equal to 200 µm, such as larger than or equal to 250 µm, such as larger than or equal to 300 µm, such as larger than or equal to 350 µm such as larger than or equal to 400 µm such as larger than or equal to 500 μm such as larger than or equal to 600 μm such as larger than or equal to 700 μm such as larger than or equal to 800 μm such as larger than or equal to 900 μm, such as larger than or equal to 1 mm. In one embodiment the characteristic diameter D is less than or equal to 1 mm, such as less than or equal to 900 μm, such as less than or equal to 800 μm, such as less than or equal to 700 μm, such as less than or equal to 600 μm, such as less than or equal to 500 μm, such as less than or equal to 400 μm, such as less than or equal to 350 μm, such as less than or equal to 300 μm, such as less than or equal to 250 μm, such as less than or equal to 200 μm, such as less than or equal to 175 μm, such as less than or equal to 150 μm, such as less than or equal to 125 μm, such as less than or equal to 100 μm, such as less than or equal to 75 μm, such as less than or equal to 50 μm, such as less than or equal to 25 μm. A large core may allow for a higher damage threshold of the facet of the input end of the fibre and/or a higher damage threshold of the bulk core as the energy may be distributed over a larger area and/or volume. On the other hand a core with a smaller core may have a higher non linearity. In one embodiment the damage threshold of the input of the generator fibre is increased by splicing, or otherwise mating, the facet with a piece of bulk material, such as a material substantially identical to that forming the core. In this way the input beam may be focused inside this material while the transition from air to material is located away from the focal point (typically located on the fibre facet). Therefore the focal point of the input beam may be located in bulk material where the break down power is higher.

The generator fibre is in one embodiment multimode at least at wavelengths occupied by the pump light. In one embodiment this allows for a higher acceptance of pump light. In one embodiment the so called V number is used to determine whether a fiber is single mode or multimode. The V number is defined as $$V = \frac{2\pi}{\lambda} a$$
$$NA = \frac{2\pi}{\lambda} a \sqrt{n_{core}^2 - n_{cladding}^2}$$

where λ is the vacuum wavelength, e is the radius of the fibre core, and NA is the numerical aperture. In one embodiment a fibre is said to be single mode if it has a V number equal to or below 2.40. In one embodiment a multimode fibre is a fibre which allows two or more modes over a length of the fibre longer than 0.01 m, such as longer than 0.1 m, such as longer than 0.5 m, such as longer than 1 m, such as longer than 10 m, such as longer than 25 m, such as longer than 50 m, such as longer than 100 m, such as longer than 1 km. In one embodiment the term "allow" also refer to that the arrangement of the fibre allows for two or more modes. An example of an arrangement which may not allow two or more modes is a relatively tight coiling of the fibre. In one embodiment a higher order mode is said not be allowed if it is suppressed more than 50% relative to the fundamental mode, such as more than 75% relative to the fundamental mode, such as more than 90% relative to the fundamental mode, such as more than 10 dB relative to the fundamental mode, such as more than 20 dB relative to the fundamental mode, such as more than 30 dB relative to the fundamental mode, such as more than 40 dB relative to the fundamental mode, such as more than 50 dB relative to the fundamental mode. In one embodiment supporting at least one higher order mode refers to supporting 3 or more modes, such as 4 or more modes, such as 5 or more modes, such as 10 or more modes, such as 25 or more modes, such as 50 or more modes, such as 75 or more modes, such as 100 or more modes, such as 200 or more modes, such as 500 or more modes, such as 1000 or more modes, such as 5000 or more modes, such as 10000 or more modes. In one embodiment supporting at least one higher order mode refers to supporting less than 10000 modes, such as less than 5000 modes, such as less than 1000 modes, such as less than 500 modes, such as less than 250 modes, such as less than 100 modes, such as less than 50 modes, such as less than 25 modes, such as less than 10 modes, such as less than 5 modes, such as less than 4 modes.

In the event of the pump light having a wide spectrum the generator fibre is not necessarily multimode for the entire spectrum of the pump light. Therefore, in one embodiment the generator fibre is multimode for all wavelengths of the pump light. However, in one embodiment the generator fibre is multimode for part of the pump light. In one embodiment the generator fibre is multimoded for all wavelengths for which the material forming the core is transparent. In one embodiment said generator fibre supports one or more higher order modes in a range of wavelength ranging from below 2400 nm, such as below 2200 nm, such as below 2000 nm, such as below 1800 nm, such as below 1600 nm, such as below 1400 nm such as below 1100 nm. In one embodiment the generator fibre supports one or more higher order modes in a range of wavelengths ranging from a wavelength above 200 nm, such as above 300 nm, such as above 500 nm, such as above 600, such as above 700, such as above 800, such as above 900, such as above 1000, such as above 1100, such as above 1200, such as above 1300, such as above 1500, such as above 1600, such as above 1700, such as above 1800, such as above 1900, such as above 2000, such as above 2100, such as above 2200.

As discussed above one advantage of the present invention is that the generator fibre is in one embodiment able to accept high optical peak power. The average optical power of the pump light depends on the peak power as well as the repetition rate and pulse duration of the individual pulses. In one embodiment the average power of the pump light injected into the input end of said generator fibre is arranged to be more than or equal to 0.1 mW, such as more than or equal to 1 mW, such as more than or equal to 50 mW, such as more than or equal to 100 mW, 150 mW, such as more than or equal to 200 mW, such as more than or equal to 250 mW, such as more than or equal to 300 mW, such as more than or equal to 350 mW, such as more than or equal to 400 mW, such as more than or equal to 500 mW, such as more than or equal to 1 W, such as more than or equal to 5 W, such as more than or equal to 10 W, such as more than or equal to 50 W, such as more than or equal to 200 W, such as more than or equal to 500 W, such as more than or equal to 1,000 W, such as more than or equal to 2,000 W, such as more than or equal to 10,000 W, such as more than or equal to 50,000 W, such as more than or equal to 100,000 W. In one embodiment the average power of the pump light injected into the input end of said generator fibre is arranged to be less than or equal to 100 kW, such as less than or equal to 50 kW, such as less than or equal to 10 kW, such as less than or equal to 5 kW, such as less than or equal to 2 kW, such as less than or equal to 1 kW, such as less than or equal to 0.5 kW, such as less than or equal to 0.2 kW, such as less than or equal to 0.1 kW, such as less than or equal to 50 W, such as less than or equal to 25 W, such as less than or equal to 10 W, such as less than or equal to 5 W, such as less than or equal to 2 W, such as less than or equal to 1 W, such as less than or equal to 500 mW, such as less than or equal to 200 mW, such as less than or equal to 100 mW, such as less than or equal to 50 mW, such as less than or equal to 25 mW, such as less than or equal to 10 mW, such as less than or equal to 5 mW, such as less than or equal to 1 mW.

In one embodiment the pump light source is arranged to inject pump light into the input end of said generator fibre where said pump light is substantially continuous wave (CW). In the case of CW light the term peak power otherwise discussed in this text is taken to refer to the average optical power of the CW light. Pumping the generator fibre using a CW source may simplify the optical design relative to a light source with a pulsed pump and some applications of the light source may benefit from a CW output. Other advantages may include cost, as high power CW sources may be cheaper pr. average power than pulsed sources. On the other hand, a pulsed pump laser may provide the same peak power as a CW pump with less average power. In one embodiment this provides for a more stabile light source and/or for a light source with a longer life time. In one embodiment a high average optical power of the pump corresponds to a high spectral density of the generated light which may or may not be desirable depending on the application of the light source.

In one embodiment the pump light source is arranged to inject pump light into the input end of said generator fibre, said pump light being pulsed with a FWHM pulse duration longer than or equal to 1 fs, such as longer than or equal to 500 fs, such as longer than or equal to 1 ps, such as longer than or equal to 10 ps, such as longer than or equal to 50 ps, such as longer than or equal to 100 ps, such as longer than or equal to 250 ps, such as longer than or equal to 500 ps, such as longer than or equal to 750 ps, such as longer than or equal to 1 ns, such as longer than or equal to 10 ns, such as longer than or equal to 50 ns, such as longer than or equal to 100 ns, such as longer than or equal to 500 ns, such as longer than or equal to 1 µs. In one embodiment the pump light is pulsed with a FWHM pulse duration shorter than or equal to 1 µs, such as shorter than or equal to 500 ns, such as shorter than or equal to 100 ns, such as shorter than or equal to 50 ns, such as shorter than or equal to 10 ns, such as shorter than or equal to 1 ns, such as shorter than or equal to 750 ps, such as shorter than or equal to 500 ps, such as shorter than or equal to 250 ps, such as shorter than or equal to 100 ps, such as shorter than or equal to 50 ps, such as shorter than or equal to 10 ps, such as shorter than or equal to 1 ps, such as shorter than or equal to 500 fs, such as shorter than or equal to 250 fs, such as shorter than or equal to 100 fs, such as shorter than or equal to 50 fs, such as shorter than or equal to 10 fs, such as shorter than or equal to 5 fs, such as shorter than or equal to 1 fs. In relation to SC generation a pulsed source having short pulse may have the advantage of providing a higher peak power with less pulse energy which often is the critical parameter in relation to damage threshold. A higher peak power often provides a wider generated spectrum. On the other hand longer pulses may require a less sophisticated pump source. In one embodiment said pump light being pulsed with a FWHM pulse duration is shorter than 1 ps, such as shorter than 500 ns, such as shorter than 100 ns, such as shorter than 10 ns, such as shorter than 1 ns, such as shorter than 500 ps, such as shorter than 250 ps, such as shorter than 100 ps, such as shorter than 50 ps, such as shorter than 50 ps, such as shorter than 10 ps, such as shorter than 5 ps, such as shorter than 1 ps, such as shorter than 500 fs, such as shorter than 100 fs.

In one embodiment the pump source is arranged to inject pulsed light where each pulse comprise a pulse energy higher than 50 µJ, such as equal to or higher than 100 µJ, such as equal to or higher than 200 µJ, such as equal to or higher than 300 µJ, such as equal to or higher than 500 µJ, such as equal to or higher than 1 mJ, such as equal to or higher than 10 mJ.

In one embodiment the output light is pulsed where each pulse comprise a pulse energy higher than 50 µJ, such as equal to or higher than 100 µJ, such as equal to or higher than 200 µJ, such as equal to or higher than 300 µJ, such as equal to or higher than 500 µJ, such as equal to or higher than 1 mJ, such as equal to or higher than 10 mJ.

In one embodiment the average peak power density of the pump light over the core is more than or equal to 100 $W/(\pi \cdot D^2/4) \geq 1, 2$ W/µm$^2$, such as larger than or equal to 25 W/µm$^2$, such as larger than or equal to 50 W/µm$^2$, such as larger than or equal to 75 W/µm$^2$, such as larger than or equal to 100 W/µm$^2$, such as larger than or equal to 250 W/µm$^2$, such as larger than or equal to 500 W/µm$^2$, such as larger than or equal to 1 kW/µm$^2$, such as larger than or equal to 10 kW/µm$^2$, such as larger than or equal to 25 kW/µm$^2$, such as larger than or equal to 50 kW/µm$^2$, such as larger than or equal to 100 kW/µm$^2$, such as larger than or equal to 250 kW/µm$^2$. In one embodiment the average peak power density of the pump light over the core is less than or equal to 250 kW/µm$^2$, such as less than or equal to 100 kW/µm$^2$, such as less than or equal to 10 kW/µm$^2$, such as less than or equal to 1 kW/µm$^2$, such as less than or equal to 500 W/µm$^2$, such as less than or equal to 250 W/µm$^2$, such as less than or equal to 100 W/µm$^2$, such as less than or equal to 50 W/µm$^2$, such as less than or equal to 10 W/µm$^2$, such as less than or equal to 1 W/µm$^2$.

For some applications of a pulsed source with a high average power is beneficial, e.g. to provide a low signal-to-noise ratio, whereas other applications may require a low average power such as to provide eye safety and/or to reduce cost. Apart from peak power and pulse duration, repetition rate may be used to set the average power. In one application it may be advantageous to have high repetition rate so that for a slower detector the source will appear to be a CW source. In one embodiment the pump light source is arranged to inject pump light into the input end of said generator fibre, said pump light being pulsed with a repetition rate higher than or equal to 1 Hz, such as higher than or equal to 500 Hz, such as higher than or equal to 1 kHz, such as higher than or equal to 100 kHz, such as higher than or equal to 250 kHz, such as higher than or equal to 500 kHz, such as higher than or equal to 750 kHz, such as higher than or equal to 1 MHz, such as higher than or equal to 10 MHz, such as higher than or equal to 50 MHz, such as higher than or equal to 100 MHz, such as higher than or equal to 250 MHz, such as higher than or equal to 500 MHz, such as higher than or equal to 1 GHz. In one embodiment the pump light source is arranged to inject pump light into the input end of said generator fibre, said pump light being pulsed with a repetition rate lower than or equal to 1 GHz, such as lower than or equal to 500 MHz, such as lower than or equal to 250 MHz, such as lower than or equal to 100 MHz, such as lower than or equal to 50 MHz, such as lower than or equal to 25 MHz, such as lower than or equal to 10 MHz, such as lower than or equal to 1 MHz, such as lower than or equal to 500 Hz, such as lower than or equal to 250 Hz, such as lower than or equal to 100 Hz, such as lower than or equal to 50 Hz, such as lower than or equal to 10 Hz.

In the context of the present text the spectral width $\Delta\lambda$ of the injected pump light may in one embodiment be the FWHM of the spectrum of the injected light. However, there may be embodiments of the invention where FWHM does not provide a good measure of the spectral width $\Delta\lambda$. In one embodiment the pump light source is arranged to inject light with optical power at two or more separate center wavelengths substantially simultaneously, such as at 1064 nm and 532 nm. In this event the spectral width of the light around each separate center wavelength is to be treated separately. In one embodiment any claimed limitation involving Δλ refers to the limitation being fulfilled for injected light around at least one of the center wavelengths, such as for the light around at least 50% of the center wavelengths, such as for the light around at least the majority of the center wavelengths, such as for the light around all of the center wavelengths. In one embodiment the injected pump light is a super continuum. In one such embodiment any claimed limitation involving Δλ refers to the limitation being fulfilled for a spectrum comprising at least 10% of the power of the injected light, such as at least 20%, such as at least 30%, such as at least 40%, such as at least 50%, such as at least 60%, such as at least 70%, such as at least 80%, such as at least 90%, such as at least 99%, such as 100%.

In principle the pump source may be any source suitable for providing the required light parameters, such as pulse properties, beam properties and/or CW light. Examples of light sources comprise a Q-switched laser, a mode locked laser, a flash lamp pumped solid state laser, a frequency doubled laser, a frequency tripled laser, fibre laser, a multimode fibre laser, side pumped DPSS.

The concept of beam cleanup via Raman scattering (SRS cleanup) refers to an effect where the fundamental mode of a multimode fibre is preferred for light generated by stimulated Raman scattering. In this way relatively more light will be in the fundamental mode after a Raman shift than before the Raman shift. One model of SRS cleanup may be found in the paper N. B. Terry, T. G. Alley, T. H. Russell, "An explanation of SRS beam cleanup in gradedindex fibres and the absence of SRS beam cleanup in step-index fibres", Opt. Expr., Vol. 15, No. 26, 2007. In this paper it was shown that while a graded index-fibre (parabolic core with $\alpha \approx 2$) allowed SRS cleanup a step index fibre did not. It is found that other index profiles may also facilitate SRS cleanup. However, in one embodiment the findings of this article should not be construed so as to limit the scope of the present invention. In one embodiment In one embodiment SRS model cleaning refers to SRS cleanup. In one embodiment of the invention SRS modal cleaning refers to any process where light is red-shifted while relatively more light is found in the fundamental mode after said red-shifting relative to before.

In one embodiment of the invention it is found SRS model cleaning is allowed for fibres having a core shaped according to the power-law index profile where $\alpha > 2$, such as $\alpha \geq 3$, such as $\alpha \geq 4$, such as $\alpha \geq 5$, such as $\alpha \geq 10$, such as $\alpha \geq 15$, such as $\alpha \approx 20$, such as $\alpha \approx 25$, such as $\alpha \approx 50$.

As discussed above the generator fibre is pumped at wavelengths below $\lambda_{ZDW}$ to allow SRS model cleaning to take effect before the smooth SC is generated. In one embodiment the generator is pumped sufficiently close to the $\lambda_{ZDW}$ so that only an insignificant amount of the pump light is allowed to generate a smooth SC without red shifting, such as less than 20% of the pump light is allowed to generate a smooth SC without red shifting, such as less than 10%, such as less than 5%, such as less than 1%, such as less than 0.01%. In one embodiment $\lambda_{ZDW} - \lambda_{centre}$ is equal to or more than 0.5 Raman shift with $\lambda_{centre}$ as the starting wavelength, such as equal to or more than 1 Raman shift, such as equal to or more than 2 Raman shifts, such as equal to or more than 3 Raman shifts, such as equal to or more than 4 Raman shifts, such as equal to or more than 5 Raman shifts, such as equal to or more than 6 Raman shifts, such as equal to or more than 7 Raman shifts, such as equal to or more than 8 Raman shift, such as equal to or more than 9 Raman shifts, such as equal to or more than 10 Raman shifts, such as equal to or more than 15 Raman shift, such as equal to or more than 20 Raman shifts. In one embodiment $\lambda_{ZDW} - \lambda_{centre}$ is equal to or less than 20 Raman shift with $\lambda_{centre}$ as the starting wavelength, such as equal to or less than 15 Raman shift, such as equal to or less than 10 Raman shift, such as equal to or less than 9 Raman shift, such as equal to or less than 8 Raman shift, such as equal to or less than 7 Raman shift, such as equal to or less than 6 Raman shift, such as equal to or less than 5 Raman shift, such as equal to or less than 4 Raman shift, such as equal to or less than 3 Raman shift, such as equal to or less than 2 Raman shift, such as equal to or less than 1 Raman shift.

In one embodiment the length of the generator fibre may affect the output light. In one embodiment the length of the fibre influences to what extend model clean up takes effect. In one embodiment the absorption of the fibre affects the output light and in one embodiment one or more non linear process involved in generating the generated light is affected by the length of the fibre. The length of the fibre may therefore in one embodiment be considered a design parameter for achieving the desired output light. In one embodiment the generator fibre has a length of at least 1 m, such as at least 2 m, such as at least 5 m, such as at least 10 m, such as at least 20 m, such as at least 50 m, such as at least 75 m, such as at least 100 m, such as at least 150 m, such as at least 250 m, such as at least 500 m, such as at least 750 m, such as at least 1.000 m, such as at least 5.000 m, such as at least 10.000 m. In one embodiment the generator fibre has a length of at less than 10 km, such as less than 1 km, such as less than 500 m, such as less than 250 m, such as less than 100 m, such as less then 75 m, such as less than 50 m, such as less than 25 m, such as less than 10, such as less than 5 m, such as less than 1 m. In one embodiment the generator fibre has length between 10 m and 100.000 m, such as between 50 m and 10.000 m, such as between 100 m and 1.000 m, such as between 200 m and 500 m In one embodiment the generator fibre has a numerical aperture at the centre wavelength of the pump light of more than or equal to 0.10, such as more than or equal to 0.12, such as more than or equal to 0.15, such as more than or equal to 0.18, such as more than or equal to 0.20, such as more than or equal to 0.22, such as more than or equal to 0.30, such as more than or equal to 0.40, such as more than or equal to 0.50. In one embodiment said generator fibre has a numerical aperture at the centre wavelength of the pump light of less than or equal to 0.50, such as less than or equal to 0.40, such as less than or equal to 0.30, such as less than or equal to 0.22, such as less than or equal to 0.20, such as less than or equal to 0.18, such as less than or equal to 0.15, such as less than or equal to 0.12, such as less than or equal to 0.10. As discussed above, a relatively large NA may allow the core to accept pump beams with relatively high $M^2$.

In one embodiment the centre wavelength of the pump source is longer than or equal to 0.3 µm, such as longer than or equal to 0.4 µm, such as longer than or equal to 0.5 µm, such as longer than or equal to 0.6 µm, such as longer than or equal to 0.7 µm, such as longer than or equal to 0.8 µm, such as longer than or equal to 0.9 µm, such as longer than or equal to 1 µm, such as longer than or equal to 1.1 µm, such as longer than or equal to 1.2 µm, such as longer than or equal to 1.3 µm, such as longer than or equal to 1.5 µm, such as longer than or equal to 1.6 µm, such as longer than or equal to 1.7 µm, such as longer than or equal to 1.9 µm, such as longer than or equal to 2 µm, such as longer than or equal to 2.1 µm, such as longer than or equal to 2.2 µm. In one embodiment the centre wavelength of the pump source is shorter than or equal to 2.2 µm, such as shorter than or equal to 2.1 µm, such as shorter than or equal to 2.0 µm, such as shorter than or equal to 1.9 µm, such as shorter than or equal to 1.8 µm, such as shorter than or equal to 1.7 µm, such as shorter than or equal to 1.6 µm, such as shorter than or equal to 1.5 µm, such as shorter than or equal to 1.4 µm, such as shorter than or equal to 1.3 µm, such as shorter than or equal to 1.2 µm, such as shorter than or equal to 1.1 µm, such as shorter than or equal to 1.0 µm, such as shorter than or equal to 0.9 µm, such as shorter than or equal to 0.8 µm, such as shorter than or equal to 0.7 µm, such as shorter than or equal to 0.6 µm, such as shorter than or equal to 0.5 µm, such as shorter than or equal to 0.4 µm, such as shorter than or equal to 0.3 µm. In one embodiment a short centre wavelength may have the advantage that it takes many red-shifts to reach the zero dispersion wavelength of the material and therefore may provide a more clean (i.e. lower $M^2$) red-shifted pump for generation of the smooth super continuum. At the same time pump light with a short centre wavelength and its red-shifted derivatives may contribute further to the short wavelength section of the output spectrum. This may serve to provide more output power at short wavelengths in the output light. In one embodiment it is preferential to use a longer pump wavelength. In one such embodiment a longer wavelength provides less red shifted pump light which may, in one embodiment, otherwise deteriorate the beam quality of output light.

In one embodiment the generator is pumped by at least two or more separate centre wavelengths either originating from the same source or from separate sources. In one embodiment pump light at two or more separate centre wavelengths is pulsed and synchronised, so that the light overlaps at least partly in some distance through the generator fibre. This allows in one embodiment the pump light to interact either directly or via generated light. In one embodiment the light pulses enter the fibre at the same time and in one embodiment the light pulses are arranged to meet during the passing of the generator fibre. In one embodiment the pulses are arranged to meet substantially at the output end of the generator fibre, so as to avoid substantially all interaction in the non-linear generation while obtaining a single pulse on the output of the generator fibre. In one embodiment the light pulses do not overlap in the generator fibre. In one embodiment light generated due to non-linear effects in the fibre from one pulse is arranged to overlap with a second pulse and/or its derivatives (i.e. light generated from that pulse due to non-linear effects in the fibre). As noted above one or more pulses may originate from the same source, such as one pulse at 1064 nm and a second which is part of the first pulse frequency doubled to 532 nm. When pulses originate from the same source phase matching between the pulses may be simpler to obtain relative to synchronising multiple sources. However, phase matching is in one embodiment not necessarily required for non-linear interaction, such as in embodiments where pump light is provided as described by G. Genty, J. M. Dudley, B. J. Eggleton, "Modulation control and spectral shaping of optical fibre supercontinuum generation in the picosecond regime", Appl Phys B (2009) 94:187-194.

In the present context separate centre wavelengths are in one embodiment taken to mean that the spectrum of the injected pump light comprises two or more peaks which overlap less than 50%, such as less than 40%, such as less than 30%, such as less than 20%, such as less than 10%, such as less than 1%. In one embodiment separate centre wavelengths are understood to mean that the pump source(s) is designed so that the injection of pump light at one or more separate wavelengths may, at least in principle, be switched off e.g. by blocking a beam path in the pump source, substantially without affecting the other(s).

In one embodiment the pump source is formed by multiple light sources such as a laser diode array, multiple lasers combined via a fibre optic combiner, and multiple lasers combined, either coherently or incoherently, via bulk optics. These multiple sources may form a pump source having a single centre wavelength or a pump source with two or more separate centre wavelengths. As discussed above, the required beam quality of the pump source may in one embodiment be relatively low and it may therefore be relatively simple to obtain high optical power in the injected pump light by combining several sources.

In one embodiment the injected pump light has a high beam quality. In one embodiment $M^2_{in}$ of the pump light injected on the input end of the generator fibre is lower than or equal to 500, such as lower than or equal to 250, such as lower than or equal to 250, such as lower than or equal to 100, such as lower than or equal to 80, such as lower than or equal to 60, such as lower than or equal to 40, such as lower than or equal to 25, such as lower than or equal to 10, such as lower than or equal to 4, such as lower than or equal to 2, such as lower than or equal to 1.7, such as less than 1.3, such as less than 1.2, such as substantially 1.1, such as less than 1.1, such as substantially 1. In one embodiment In one embodiment the pump source is a single mode source. In one embodiment the generator may accept pump light with a relatively high $M^2_{in}$, e.g. by having a relatively large core diameter and/or due to SRS modal cleaning (or other means of modal cleaning) the injected pump light may be allowed to have an $M^2_{in}$ that is higher than or equal to 1, such as such as higher than or equal to 1.1, such as such as higher than or equal to 1.3, such as higher than or equal to 4, such as higher than or equal to 10, such as higher than or equal to 25, such as higher than or equal to 40, such as higher than or equal to 60, such as higher than or equal to 80, such as higher than or equal to 100, such as higher than or equal to 250, such as higher than or equal to 500. In one embodiment a high $M^2_{in}$ may be beneficial as high optical power may be provided with a relatively cheap and/or simple and/or robust source.

As explained above the SRS modal cleaning may in one embodiment improve the beam quality of the output light significantly. Accordingly, in one embodiment said pump source and said generator fibre are arranged so that during use said generator fibre emits output light at the output end having an average $M^2_{out}$ of less than or equal to 10, such as less than or equal to 5, such as less than or equal to 4, such as less than or equal to 3, such as less than or equal to 2, such as less than or equal to 1.3, such as less than or equal to 1.1, such as substantially 1. In one embodiment the average $M^2_{out}$ is more than or equal to 1, such as higher than or equal to 1.1, such as higher than or equal to 1.2, such as more than or equal to 1.3, such as more than or equal to 2, such as more than or equal to 3, such as more than or equal to 4, such as more than or equal to 5, such as more than or equal to 10. Here the average $M^2_{out}$ refers to an average over wavelengths in the spectrum of the output light. In one embodiment this average is a weighted average so the wavelengths having high optical power attribute more to the average than wavelengths with low optical power. In one embodiment the spectrum substantially around the centre wavelength(s) of the pump source is excluded from the calculation of the average, here substantially around being taken to mean more than 0.5 nm on both sides of said centre wavelength, such as more than 1 nm on both sides of said centre wavelength, such as more than 10 nm on both sides of said centre wavelength, such as more than 20 nm on both sides of said centre wavelength, such as more than 100 nm on both sides of said centre wavelength. In one embodiment substantially around is taken to mean less than 100 nm on both sides of said centre wavelength, such as less than 100 nm on both sides of said centre wavelength, such as less than 100 nm on both sides of said centre wavelength, such as less than 20 nm on both sides of said centre wavelength, such as less than 10 nm on both sides of said centre wavelength, such as less than 1 nm on both sides of said centre wavelength.

In one embodiment the output light is substantially diffraction limited at least over the majority of the spectrum.

As explained the SRS modal cleaning may improve the beam quality of the generated output light relative to the injected pump light. Accordingly in one embodiment $M^2_{out}/M^2_{in}$ is less than one. However, in one embodiment a pump source is applied which is capable of providing injected light with a low $M^2_{in}$. Due to the multimoded nature of the generator fibre the injected light may in such an embodiment be scrambled to also reside in higher order modes inside the fibre. For such cases $M^2_{out}/M^2_{in}$ may be higher than one. Therefore, in embodiment the pump source and the generator fibre is arranged so that during use said generator fibre emits output light at the output end having an average $M^2_{out}$ and said pump source injects pump light having an $M^2_{in}$ wherein $M^2_{out}/M^2_{in}$ is less than or equal to 5, such as less than or equal to 2, such as less than or equal to 1, such as less than or equal to 0.1, such as less than or equal to 0.01, such as less than or equal 0.005, such as less than or equal to 0.002. In one embodiment $M^2_{out}/M^2_{in}$ is more than or equal to 0.002, such as more than or equal to 0.005, such as more than or equal to 0.01, such as more than or equal to 0.1, such as more than or equal to 1, such as more than or equal 2, such as more than or equal to 5. In one embodiment $M^2_{out}/M^2_{in}$ should be calculated as a function of wavelength or over specific wavelength range. In one embodiment this only refers to the calculation of the average $M^2_{out}$. In one embodiment average $M^2_{out}$ is calculated as discussed above e.g. with exclusion of wavelengths around the centre wavelength of the pump light. In one embodiment the average $M^2_{out}$ is calculated for all wavelengths of the spectrum longer than $\lambda_{ZDW}$.

BRIEF DESCRIPTION OF DRAWINGS

The invention will be illustrated further below in connection with exemplary embodiments and with reference to the drawings in which.

The figures are schematic and may be simplified for clarity. Throughout, the same reference numerals are used for identical or corresponding parts.

Further scope of applicability of the present invention will become apparent from the detailed description given hereinafter. However, it should be understood that the examples are given by way of illustration. Furthermore it should be noted that a feature discussed in relation to one embodiment or example is not limited to this specific embodiment but may be applied in other embodiments as well.

Example 1

Figure 1:
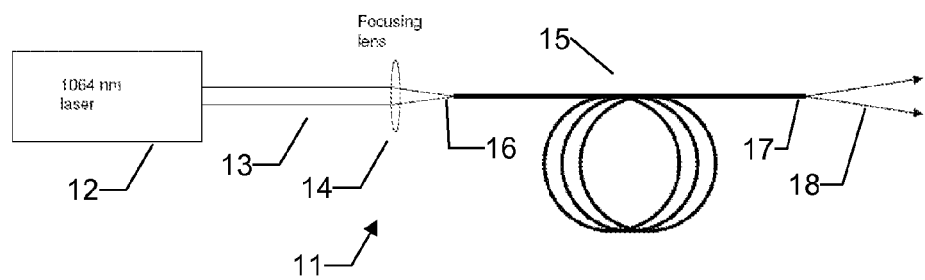
FIG. 1 shows a schematic presentation of a light source according to the invention.
Figure 2:
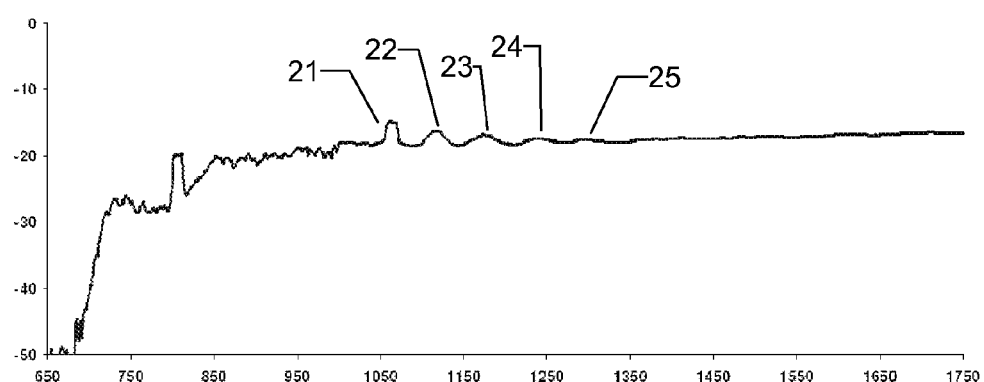
FIG. 2 shows a the spectrum of the output light produced by a light source according to the invention.

FIG. 1 show a schematic outline of a super continuum light source 11 according to the invention. The pump source 12 emits a pump beam 13 which is focused onto the input end 16 of the generator fibre 15 via a lens 14. At the output end 17 of the generator fibre 15 the output light 18 is emitted. In one embodiment the output light is substantially single mode at least for most wavelengths of the generated SC as discussed above. An exemplary spectrum of the output light of a light source according to the invention is shown in FIG. 2. Here a commercially available fibre (Infinicor of Corning Inc, Corning N.Y., USA) is applied as generator fibre 15. This fibre is a graded index fibre having a substantially parabolic index profile with a quoted core size with a diameter of 50 μm. The generator fibre 15 is pumped by a pulsed laser at 1064 nm at relatively high peak power (~200 uJ pulse energy, ~2 ns pulse, ~100 kW peak power and $M^2$ of about 2). The residual power from the pump light is identifiable as the peak 21. The peaks 22 to 25 may be attributed to subsequent Ramen shifting of the pump light as these correspond well to the stokes lines calculated for silica with a 1064 pump: $S_1$=1115 nm, $S_2$=1173 nm, $S_3$=1235 nm, $S_4$=1305. As the fourth Stokes shift passes the zero dispersion line of a silica fibre this light then acts as the pump for generation of the smooth SC likely provided by four wave mixing (FWM) providing a spectrum extending from roughly half the zero dispersion wavelength to the long wavelength absorption edge of the fibre (not shown). FWM likely halts further Raman shifts since the gain of FWM is higher. Due to SRS modal cleaning the Raman shifted light has a relatively high beam quality and as this is substantially maintained the light source capable of providing a substantially single mode output at most wavelengths. As discussed above the pump light may comprise one or more higher order modes and may increase the $M^2_{out}$ at certain wavelengths. In one embodiment the output light of a SC light source according to the invention is subsequently spatially filtered to eliminate optical components in the output light belonging to higher order modes and/or residual pump light.

Example 2

In this example the light source is identical to that of example 1 except that the pump source inject pump light at 1064 nm and 532 nm simultaneously. In one embodiment Raman shifted light originating from the 532 nm pump merges with the short wavelength light generated from the 1064 nm pump thus providing a continuum with greater spectral width. In this way a source may be provided which provides a larger portion of energy in the visible range.

Example 3

Figure 3:
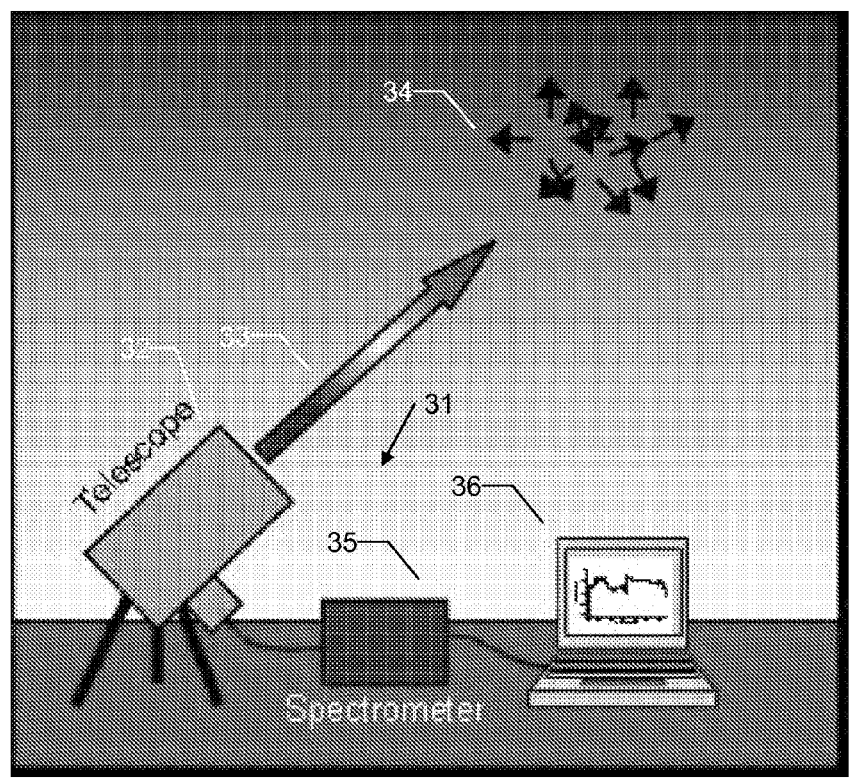
FIG. 3 shows a schematic depiction of a light source according to the invention applied to LIDAR.

FIG. 3 shows a schematic depiction of a light source according to the invention applied in a LIDAR system 31. A telescope 32 comprising a light source according to the invention emits a SC beam 33 and detects reflected light from aerosols 34 in the atmosphere. The reflected light is analysed in a spectrometer 35 and results are relayed to a computer 36. Due to the high optical power which may be provided by an embodiment of the invention the signal-to-noise ratio (SNR) may be improved which may effectively extend the range of the system and/or allow for detection of smaller amounts of aerosols. Similarly to this example the system may instead be configured as a transmission system where the light beam is directed towards a detector. Such a system is also sometimes referred to as a DOAS system.

The present invention may also be applied as a light source in so called active hyperspectral imaging where the increased power and/or good beam quality which may be provided with the present invention may improve SNR of such systems. Further details of active hyperspectral imaging may found in the literature such as the paper: M. L. Nischan, R. M. Joseph, J. C. Libby, and J. P. Kerekes, "Active Spectral Imaging", Lincoln Lab. Journ., Vol. 14, p. 131 pp, 2003.

Example 4

Figure 4:
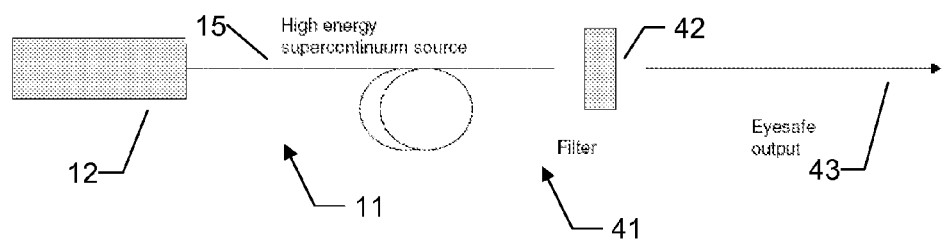
FIG. 4 shows a schematic presentation of a light source according to the invention applied to eye safe LIDAR.

FIG. 4 shows a schematic outline of a light source 41 according to the invention where the output light is directed to a filter 42. In one embodiment the filter is arranged to reduce transmitted light at wavelengths shorter than about 1500 nm. Wavelengths above roughly 1500 nm are typically considered eye-safe because the light is not transmitted by the lens of the eye. The present invention provides a simple and robust technique for generating high energy light in this region of the spectrum. When compared to other techniques such as OPO's the invention may in one embodiment have lower cost, higher stability and/or be more compact.

Example 5

Figure 5:
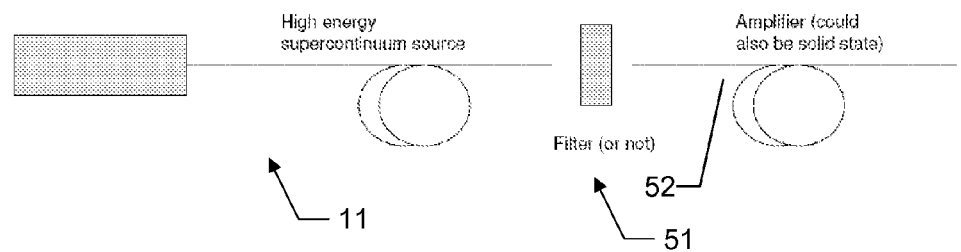
FIG. 5 shows a schematic presentation of a light source according to the invention applied to seed an optical fibre amplifier.
Figure 6:
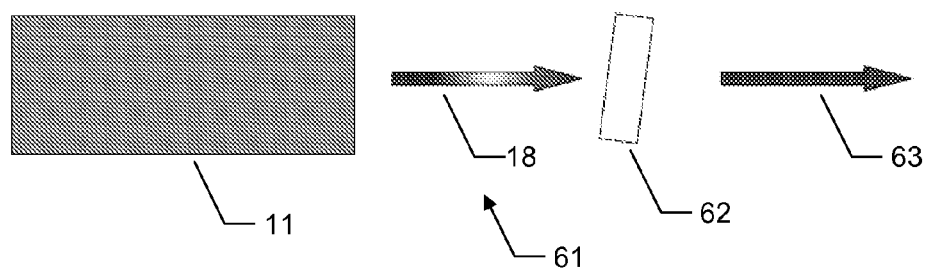
FIG. 6 shows a schematic presentation of a light source according to the invention applied to form a tunable light source.

FIG. 5 shows a schematic outline of an optical amplifier 51 comprising a light source according to the invention 11 as a seed for a gain medium 52. The gain medium 52 is shown as an active fibre but may in principle be any suitable active optical medium such as a suitable semi conductor. In one embodiment the output light of the light source 11 is filtered by the filter 53. With a broad spectrum it may be possible to select specific wavelength(s) to pump the gain medium. Such wavelengths may provide desired amplifier performance such as low noise.

Example 6

FIG. 5 shows a schematic outline of a tuneable light source 61 comprising a light source according to the invention 11. The light source 61 further comprises a non linear crystal 62 which may be applied to transform wavelengths of the output light 18 of the SC light source 11 for example to shorter wavelengths depending on the angle of incidence on the crystal 62. In this way the light source 61 may be tuneable by changing the angle between output light 18 and crystal 62.

Example 7

Figure 7:
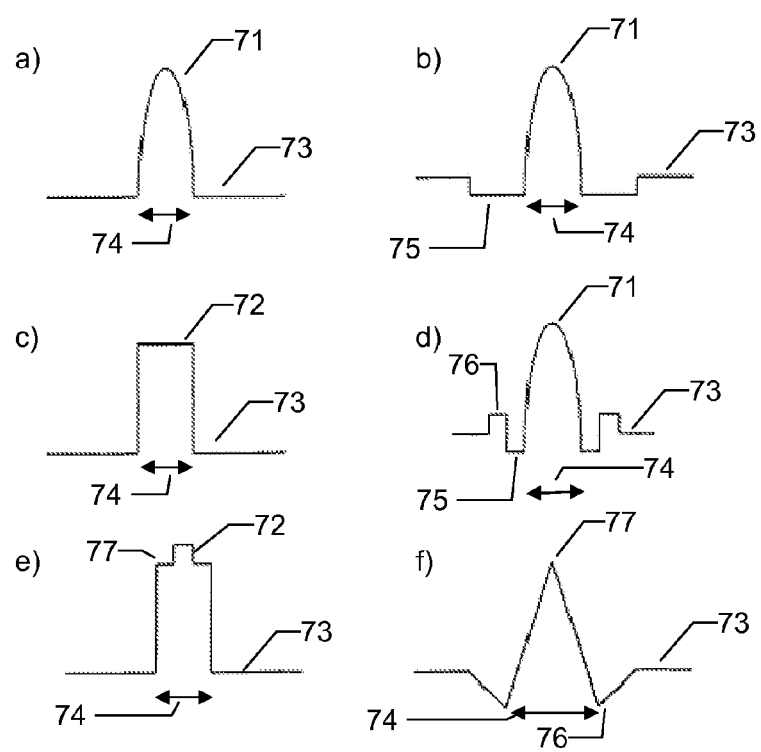
FIG. 7 shows examples of refractive index profiles.

FIG. 7 (a-f) shows exemplary refractive index profiles of a rotationally symmetric optical fibre. The core 71 may be said to resemble the core shape of a graded index profile in FIG. 7a, b,d whereas the core 72 of FIG. 7c,e resemble the core shape of a step index fibre. The region 77 of FIG. 7f represents what is typically known as a cladding pedestal to offset the index of a core 72. The refractive index of cladding 73 is shown as a constant value surrounding any index variation around the core. In a real world fibre the refractive index of the cladding 73 will not extend to infinity but normally to a diameter large enough to enstJre that for all practical purposes the outer diameter of the cladding is irrelevant for light guided in the core. In principle the refractive index profile may not be constant as discussed in regard to the characteristic diameter D. Yet another definition of the characteristic diameter of the core of a fibre is the outer diameter of a refractive index profile which may provide guiding when light is launched in the center of the fibre (assuming cylinder symmetry). In such an embodiment a guided field may have an evanescent field in the cladding. This characteristic diameter has been indicated by the double arrow 74 in each figure. FIGS. 7b, d, f has a so-called depressed cladding 75 surrounding the core. The profile 7d further has an outer core 76 which may guide light at longer wavelengths whereas the core 71 functions as the primary guide (in one embodiment understood as comprising substantially all the optical energy of the mode within its bounds) for shorter wavelengths. In one embodiment the characteristic diameter D is defined as the diameter of the inner core when the fibre has multiple core regions. In one embodiment D is defined as the characteristic diameter of the dominant core at the center wavelength of the pump and/or the zero dispersion wavelength.

Figure 8:
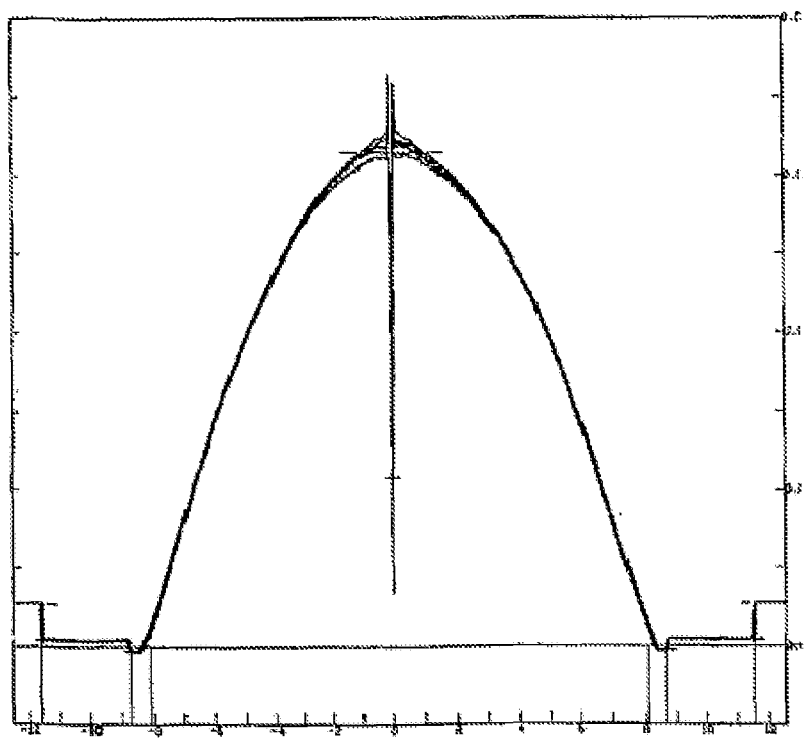
FIG. 8 shows an index profile of a preform suitable for drawing a graded index fiber.

FIG. 8 shows an index profile of a preform suitable for drawing a graded index fibre. The profile was obtained by means of plasma deposition and exhibits a central dip due to the cavity in the glass tube to which inside the plasma has been deposited. Such performs are commercialized e.g. by the company Draka Fibre Inc. Examples of MM fibres that may find use for the present invention includes commercially available fibres, such as the following fibres from Draka Fibre Inc.:

Standard 50/125 m and 62.5/125 m (OM1 and OM2)
iCap and HiCapXS (FTTH); 50/125 m and 62.5/125 m (1 Gb/s OM1+ and OM2+)
MaxCap300 and MaxCap550 (10 Gb/s OM3 and OM3+).

In the present text the invention has been discussed with basis in super continuum generation in silica based optical fibre. However, the invention may also be practiced in other types of waveguides. These waveguides include planar waveguides and waveguides or fibres having a base material different from silica.

The invention claimed is:

1. A supercontinuum light source comprising a pump source arranged to emit pump light in a pump beam, said pump light having a centre wavelength $\lambda_{centre}$, the light source further comprising a generator fibre having an input end and an output end, said generator fibre supporting a fundamental mode and one or more higher order modes at least at said centre wavelength, and having a zero dispersion wavelength $\lambda_{ZDW}$ for said fundamental mode and a transverse refractive index profile with a core region having a characteristic diameter $D \leq 10$ μm, said pump source being arranged to inject pump light into the input end of said generator fibre with an optical peak power $P \geq 50$ W and a spectral width $\Delta\lambda$ spectrum, wherein said generator fibre is a graded index fibre so that said refractive index profile is arranged to allow SRS modal cleaning and $\lambda_{ZDW} - (\lambda_{centre} + \Delta\lambda/2) \geq 0$.

2. The light source of claim 1 wherein said characteristic diameter D is larger than or equal to 25 μm.

3. The light source of claim 1 wherein said characteristic diameter D is larger than or equal to 50 μm.

4. The light source of claim 1 wherein said characteristic diameter D is larger than or equal to 100 μm.

5. The light source of claim 1 wherein said generator fibre has a numerical aperture of more than or equal to 0.10.

6. The light source of claim 1 wherein said generator fibre has a numerical aperture of more than or equal to 0.20.

7. The light source of claim 1 wherein said generator fibre has a numerical aperture of more than or equal to 0.40.

8. The light source of claim 1 wherein $\lambda_{ZDW} - \lambda_{centre}$ is equal to or more than 0.5 Raman shift.

9. The light source of claim 1 wherein $\lambda_{ZDW}-\lambda_{centre}$ centre is equal to or more than 5 Raman shift.

10. The light source of claim 1 wherein $\lambda_{ZDW}-\lambda_{centre}$ is equal to or less than Raman shift.

11. The light source of claim 1 wherein an average power of the pump light injected into the input end of said generator fibre is arranged to be more than or equal to 1 W.

12. The light source of claim 1 wherein said pump light source is arranged to inject pump light with optical power at two or more separate centre wavelengths substantially simultaneously.

13. The light source of claim 1 wherein the pump source is arranged so that $M^2_{in}$ of the pump light injected on the input end of the generator fibre is higher than or equal to 4.

14. The light source of claim 1 wherein the pump source is arranged so that $M^2_{in}$ of the pump light injected on the input end of the generator fibre is higher than or equal to 25.

15. The light source of claim 1 wherein said pump source and said generator fibre are arranged so that during use said generator fibre emits output light at the output end having an average $M^2_{out}$ and said pump source injects pump light having an $M^2_{in}$ wherein $M^2_{out}/M^2_{in}$ is less than 1.

16. The light source of claim 1 wherein said pump source and said generator fibre are arranged so that during use said generator fibre emits output light having the spectral width of more than 500 nm.

17. The light source of claim 1 wherein said pump source and said generator fibre are arranged so that during use said generator fibre emits output light having the spectral width of more than 1000 nm.

18. The light source of claim 1 wherein the cores of said generator fiber has a parabolic index profile.

19. An optical system comprising a light source according to claim 1.

20. A tunable light source comprising a super continuum light source according claim 1 and a non-linear crystal arranged so that at least a part of output light emitted from the output end of the generator fibre is brought into interaction with said non-linear crystal under an angle φ relative to the surface of said non-linear crystal.

21. A system selected from the group of a hyperspectral imaging system, white light LIDAR (DOAS) system, an optical amplifier and an illumination system, wherein the system comprises the supercontinuum light source of claim 1.

* * * * *